(12) United States Patent
Moon et al.

(10) Patent No.: US 9,676,886 B2
(45) Date of Patent: *Jun. 13, 2017

(54) ONE-POT SYNTHESIS OF FLEXIBLE POLY-P-(PHENYLENEETHYNYLENE)S WITH CONTROLLED CONJUGATED LENGTH

(71) Applicants: Joong Ho Moon, Weston, FL (US); Tereza Vokata, Miami, FL (US)

(72) Inventors: Joong Ho Moon, Weston, FL (US); Tereza Vokata, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/821,890

(22) Filed: Aug. 10, 2015

(65) Prior Publication Data
US 2016/0039962 A1 Feb. 11, 2016

Related U.S. Application Data

(60) Provisional application No. 62/035,055, filed on Aug. 8, 2014.

(51) Int. Cl.
*C08F 238/02* (2006.01)
*C08F 238/00* (2006.01)

(52) U.S. Cl.
CPC .................. *C08F 238/02* (2013.01)

(58) Field of Classification Search
CPC .................................................. C08F 238/02

USPC ........................................... 528/396; 526/285
See application file for complete search history.

(56) References Cited

PUBLICATIONS

U.S. Appl. No. 15/000,232's claims; Jan. 2016.*
Åkerfeldt, S., et al., "Spectrophotometric Determination of Disulfides, Sulfinic Acids, Thio Ethers, and Thiols with the Palladium (II) Ion," *Analytical Biochemistry*, 1964, pp. 223-228, vol. 8.
Chinchilla, R. et al., "The Sonogashira Reaction: A Booming Methodology in Synthetic Organic Chemistry," *Chem. Rev.*, 2007, pp. 874-922, vol. 107.
Chong, H. et al., "Synthesis and Characterization of Degradable Water-Soluble Fluorescent Polymers," *Macromolecules*, 2010, pp. 10196-10200, vol. 43.
Günes, S. et al., "Conjugated Polymer-Based Organic Solar Cells," *Chem. Rev.*, 2007, pp. 1324-1338, vol. 107.
Hay, M. et al., "Aliphatic Phenylene Vinylene Copolymers: Tuning the Color of Luminescence through Co-monomer Feed Ratios," *J. Am. Chem. Soc.*, 1995, pp. 7112-7118, vol. 117.

(Continued)

*Primary Examiner* — Duc Truong
(74) *Attorney, Agent, or Firm* — Saliwanchik, Lloyd & Eisenchenk

(57) ABSTRACT

A novel monomer design for the synthesis of PPE-type polymers containing conjugated segments of well-defined length connected by flexible linkers under Sonogashira reaction conditions is presented. The resulting polymers retain the photophysical properties of a fully conjugated PPE. The extent of incorporation of the flexible units along the backbone is governed by the comonomer feed ratio and can be varied in a statistically predictable fashion.

11 Claims, 12 Drawing Sheets

(56) References Cited

PUBLICATIONS

He, C. et al., "Synergistic Catalysis in the Sonogashira Coupling Reaction: Quanitative Kinetic Investigation of Transmetalation," *Angew. Chem. Int. Ed.*, 2013, p. 1527-1530, vol. 52.

Huang, S. et al., "Rapid Bi-directional Synthesis of Oligo(1,4-phenylene ethynylene)s," *Tetrahedron Letters*, 1999, pp. 3347-3350, vol. 40.

Kang, S. et al., "Controlled Catalyst Transfer Polycondensation and Surface-Initiated Polymerization of a p-Phenyleneethynylene-Based Monomer," *J. Am. Chem. Soc.*, 2013, pp. 4984-4987, vol. 135.

Kovalev, A.I. et al., "Chain Growth Polycondensation as a Polymer Generating Reaction in the Synthesis of Oligo(p-phenyleneethynylene)s with Low Polydispersity," *Macromol. Chem. Phys.*, 2005, pp. 2112-2121, vol. 206.

Li, N. et al., "Theoretical Study of Spectroscopic Properties of Dimethoxy-p-Phenylene-Ethynylene Oligomers: Planarization of the Conjugated Backbone," *J. Phys. Chem. A*, 2007, pp. 9393-9398, vol. 111.

Mendez, E. et al., "Side chain and backbone structure-dependent subcellular localization and toxicity of conjugated polymer nanoparticles," *Chem. Commun.*, 2013, pp. 6048-6050, vol. 49.

Saito, G. et al., "Drug delivery strategy utilizing conjugation via reversible disulfide linkages: role and site of cellular reducing activities," *Advanced Drug Delivery Reviews*, 2003, pp. 199-215, vol. 55.

Schug, K.A. et al., "Noncovalent Binding between Guanidinium and Anionic Groups: Focus on Biological- and Synthetic-Based Arginine/Guanidinium Interactions with Phosph[on]ate and Sulf[on]ate Residues," *Chem. Rev.*, 2005, pp. 67-113, vol. 105.

Spera, M.B.M. et al., "Spectrochimica Acta Part A: Molecular and Biomolecular Spectroscopy," *Spectrochimica Acta Part A*, 2011, pp. 313-318, vol. 78.

Sun, M. et al., "Pyrrole-Based Narrow-Band-Gap Copolymers for Red Light-Emitting Diodes and Bulk Heterojunction Photovoltaic Cells," *Journal of Applied Polymer Science*, 2010, pp. 1462-1468, vol. 118.

Swager, T.M. et al., "Fluorescence Studies of Poly(p-phenyleneethynylene)s: The Effect of Anthracene Substitution," *J. Phys. Chem.*, 1995, pp. 4886-4893, vol. 99.

Tabujew, I. et al., "The Guanidinium Group as a Key Part of Water-Soluble Polymer Carriers for siRNA Complexation and Protection against Degradation," *Macromol. Rapid Commun.*, 2014, pp. 1191-1197, vol. 35.

Takagi, K. et al., "Synthesis and Light-Emitting Behavior of Silicon-Bridged Fluorene Copolymers Bearing Oligoarylenevinylene Chromophore," *Polymer Journal*, 2009, pp. 733-738, vol. 41, No. 9.

Thomas III, S.W. et al., "Chemical Sensors Based on Amplifying Fluorescent Conjugated Polymers," *Chem. Rev.*, 2007, pp. 1339-1386, vol. 107.

Tour, J.M., "Conjugated Macromolecules of Precise Length and Constitution. Organic Synthesis for the Construction of Nanoarchitectures," *Chem. Rev.*, 1996, pp. 537-553, vol. 96.

Twomey, M. et al., "Fabrication of Core-Shell Nanoparticles via Controlled Aggregation of Semiflexible Conjugated Polymer and Hyaluronic Acid," *Macromolecules*, 2013, pp. 6374-6378, vol. 46.

Vargas, J.R. et al., "Cell-Penetrating, Guanidinium-Rich Molecular Transporters for Overcoming Efflux-Mediated Multidrug Resistance," *Mol. Pharmaceutics*, 2014, pp. 2553-2565, vol. 11.

Vokatá, T. et al., "Synthesis of Phenyleneethynylene-Doped Poly(p-phenylenebutadiynylene)s for Live Cell Imaging," *Macromolecules*, 2013, pp. 1253-1259, vol. 46.

Zhu, X. et al., "Conjugated polyelectrolytes with guanidinium side groups. Synthesis, photophysics and pyrophosphate sensing," *Photochem. Photobiol. Sci.*, 2014, pp. 293-300, vol. 13.

\* cited by examiner

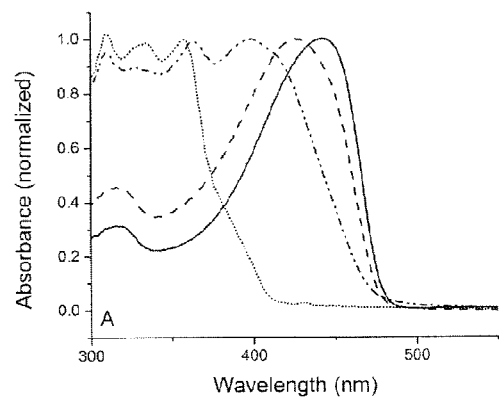 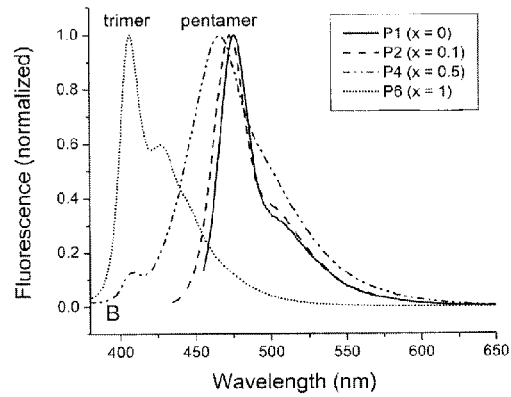
FIG. 3A                FIG. 3B
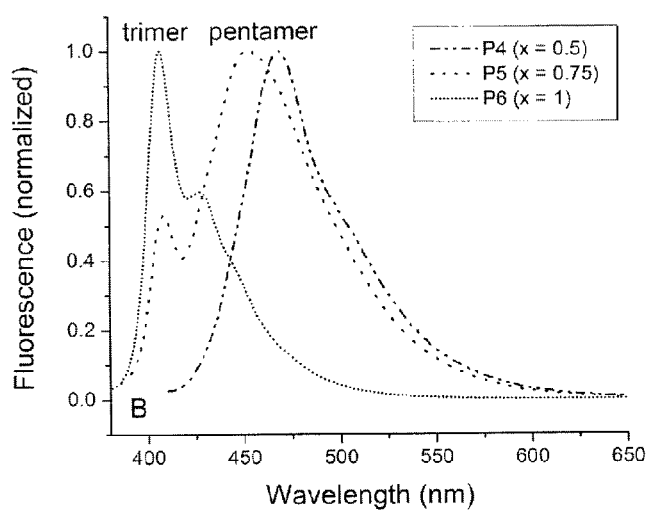
FIG. 4

ONE-POT SYNTHESIS OF FLEXIBLE POLY-P-(PHENYLENEETHYNYLENE)S WITH CONTROLLED CONJUGATED LENGTH

CROSS-REFERENCE TO A RELATED APPLICATION

This application claims the benefit of U.S. Provisional Application Ser. No. 62/035,055, filed Aug. 8, 2014, the disclosure of which is hereby incorporated by reference in its entirety, including all figures, tables and drawings.

This invention was made with government support under GM092778 awarded by the National Institute of Health. The government has certain rights in the invention.

BACKGROUND OF INVENTION

The synthesis of conjugated oligomers with precisely controlled, well-defined conjugation length has been the subject of growing interest in the conjugated polymer community. A series of oligomers of precisely controlled structure can be used as a model for the investigation of processes governing the physical and photophysical properties of the corresponding larger, polydisperse polymeric materials. Furthermore, monodisperse conjugated oligomers contain minimal structural defects compared to the polymers, and thus allow for a greater control of the material's electronic properties.[1] The synthesis of well-defined oligomers typically requires multi-step approaches utilizing many iterations of protection/deprotection chemistry and purification at each step, making such synthesis very low yielding. The development of a one-pot synthetic method towards oligomers with well-defined conjugation length is therefore highly desirable.

Among conjugated polymers (CPs), poly-p-(phenyleneethynylene)s (PPEs) are a class of bright, fluorescent materials with excellent physical and photophysical properties and emerging applications in solar cell electronics, fluorescence analyte sensing and targeted cellular delivery of therapeutics.[2]

Scheme 1. A general scheme for the formation of PPEs via Sonogashira coupling

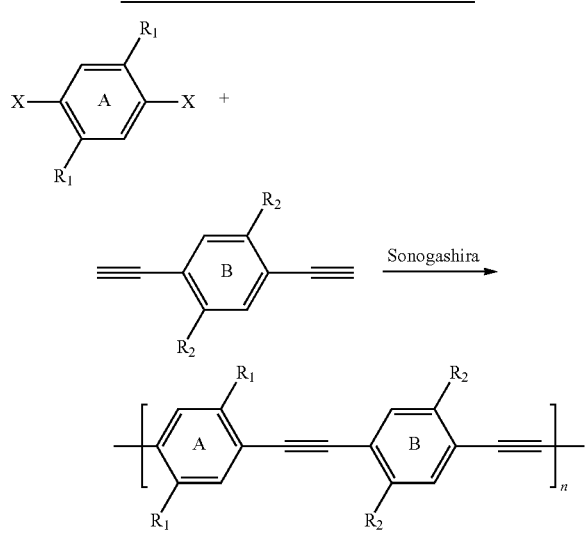

The synthesis of conventional PPEs utilizes the palladium-mediated Sonogashira coupling reaction between aryl halides and terminal alkynes (AABB-type polymerization). The polymerization under these conditions proceeds in a stepwise manner, requires a high degree of stoichiometric balance, and results in an alternating A-B-type polymer (Scheme 1) with a relatively large polydispersity index.[3]

Several approaches to the synthesis of oligo-PPEs have explored different features of the Sonogashira reaction. These include the intentional breaking of stoichiometric balance, differences in reactivity between different aryl halides,[4] polymer end-group activation,[5] and catalyst transfer polycondensation.[6] More precise control can be achieved by step-by-step or convergent synthesis utilizing a series of protection, coupling and deprotection steps.[7] All of the above approaches require multiple purification steps, and are thus time-consuming, low-yielding and costly.

PPE polymers can be tailored to a specific application through the modulation of their physical, biological and optical properties by structural modifications of the rigid conjugated backbone and the pendant side-chains. More specifically, controlled introduction of flexibility into the CP backbone with the retention of the optical properties of the fully conjugated PPE polymer is an attractive option for improving the material's solubility, modulating its aggregation properties, or including a biodegradable component for cellular applications.[8] Similarly, increased flexible content will translate to the formation of segments of shorter conjugation length, and the precise control of the amount of flexibility will therefore provide a means to control the length of conjugated segments within a polymer chain.

A semi-flexible p-phenylenebutadiynylene (PPB) CP containing a small amount (~10%) of flexible, non-conjugated units along the polymer backbone has been synthesized.[9] The synthesis took advantage of the competing Sonogashira and Glaser-type chemistry under modified Sonogashira coupling conditions, leading to the predominant formation of PPB through the Glaser homocoupling of acetylene monomers with an occasional Sonogashira-type incorporation of a deactivated flexible aryl halide into the backbone. This backbone structure modification influences polymer aggregation behavior and complexation with polyanions,[10] and has a dramatic impact on the cellular uptake mechanism and subcellular localization of conjugated polymer nanoparticles (CPNs).[11] While these findings warrant a more systematic investigation of the influence of the amount of flexibility on the polymer physical properties, it has not been possible to control the amount of flexible component due to the nature of the catalytic system (Glaser coupling).

BRIEF SUMMARY

The subject invention provides a novel monomer design for the synthesis of PPE-type polymers containing conjugated segments of well-defined length connected by flexible linkers under Sonogashira reaction conditions. Advantageously, the resulting polymers retain the photophysical properties of a fully conjugated PPE. The extent of incorporation of the flexible units along the backbone is governed by the comonomer feed ratio and can be varied in a statistically predictable fashion.

Reduced synthetic steps and efforts for purification provide important advantages (e.g., less time, materials, and money). Also, defect free conjugated materials perform better than CPs with some defects. Furthermore, facile color tuning by the one-pot synthesis provides huge benefits in materials fabrications for broad applications. Biodegradable CPs can also be used for gene/drug delivery by offering controlled release at targeting.

Biological imaging and delivery applications can also be dramatically improved. Drugs, genes, and/or labeling molecules can be delivered as nanoparticle format followed by releasing the payloads to a targeted site. By controlling degradation kinetics, controlled release and specific labeling can be achieved, while fluorescent monitoring is capable.

BRIEF DESCRIPTION OF THE FIGURES

FIG. 3A is a composite of normalized absorption spectra, and FIG. 3B is a composite of normalized emission spectra of polymers P1, P2, P4 and P6 in DMF for various co- and terpolymer PPEs according to an embodiment of the invention.

FIG. 4 is a composite of normalized emission spectra of polymers P4, P5, and P6 in DMF according to an embodiment of the invention.

DETAILED DISCLOSURE

Figure 1:
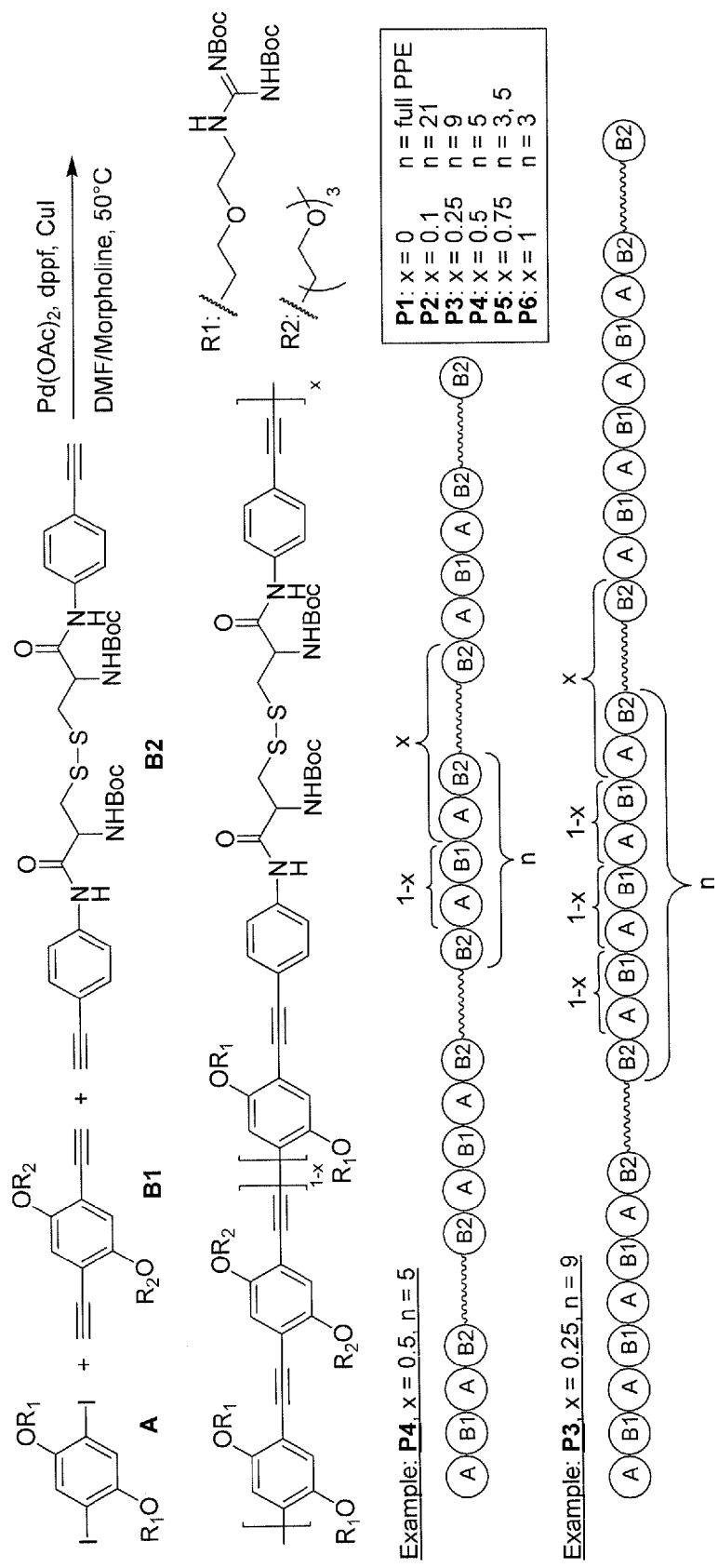
FIG. 1 is a reaction scheme for the preparation of terpolymer PPEs having a flexible linker according to an embodiment of the invention.

A novel monomer design for the synthesis of PPE-type polymers containing conjugated segments of well-defined length connected by flexible linkers under Sonogashira reaction conditions has been developed. The resulting polymers retain the photophysical properties of a fully conjugated PPE. The extent of incorporation of the flexible units along the backbone is governed by the comonomer feed ratio and can be varied in a statistically predictable fashion. Increased flexible content translates to the formation of segments of shorter conjugation length, and the precise control of the amount of flexibility therefore provides a means to control the length of conjugated segments within a polymer chain.

Specifically, the subject invention provides a novel monomer design under modified Sonogashira conditions for the formation of PPE-type polymers with precisely controlled amount of the flexible component and well-defined length of the corresponding conjugated segments. Increasing the amount of flexible units at the expense of the conjugated ones leads to the formation of shorter conjugated segments, and the conjugated length can thus be shortened in a statistically predictable fashion. Optical properties of the fully conjugated backbone are preserved in polymers with flexible content less than 25%.

The incorporation of a variable proportion of a particular monomer into a polymer formed under Sonogashira conditions requires the use of a three-monomer system with one A-type monomer and a variable feed ratio of two different B-type monomers. This system was utilized by Swager et al.[12] who introduced a variable amount of anthracene units into the PPE polymers using a three-monomer one-pot Sonogashira-type polymerization with a fixed amount of the diacetylene monomer and a variable ratio of the aryl halide and di-bromoanthracene monomers. Stoichiometric incorporation was unfortunately not observed, presumably due to the difference in aryl halide reactivity. However, other coupling chemistries (e.g. Wittig reaction[13], Suzuki coupling[14]) have successfully utilized such a ternary system to control the statistical, random percent incorporation of a particular functional unit into a polymer backbone.

The success of the stoichiometric incorporation of the flexible unit into the CP backbone under Sonogashira conditions rests heavily on minimizing the likelihood of Glaser-type homocoupling through careful monomer design and optimized reaction conditions. Since the monomer reactivity towards the Sonogashira reaction is heavily governed by the choice of aryl halide and the electronic substitution of its aromatic ring, the stoichiometry of the aryl iodide monomer A was kept constant throughout the polymer series. The feed ratio of acetylene comonomers B1 (conjugated) and B2 (flexible) was varied to achieve the controlled conjugation length modulation, as indicated in the reaction scheme shown in FIG. 1.

The factors that determine the reactivity of the acetylene monomer towards Sonogashira coupling are widely unexplored, although electron-donating groups have been recently shown to enhance the nucleophilicity of the copper acetylide, which increases the rate of the transmetalation step.[15] The predicted $pK_a$s for the B1 and B2 acetylene protons are, however, very similar (23.4 and 23.7 respectively),[16] and electronic effects can therefore be ruled out as a contributing factor towards any reactivity difference.

Monomer A with a fixed amount of incorporation was decorated with ethylene oxide side-chains containing pendant guanidinium groups. The guanidinium group is an amine-rich functionality naturally occurring in the amino acid guanidine, consisting of two delocalized primary amines and one secondary amine with a high $pK_a$ of around 13.[17] This functional group has been employed in a wide variety of synthetic materials to improve solubility and cellular uptake,[18] and it can be included in the polymers for future use in cellular applications.

The design of the flexible diacetylene monomer B2 is based on modified cystine, a naturally occurring biomolecule. In addition to its non-conjugated, flexible nature, it provides a biodegradable moiety for applications in intracellular gene delivery.[19] The fully conjugated complementary diacetylene monomer B1 has been decorated with long ethylene oxide chains to preserve polymer solubility.

The optimization of the polymerization conditions was carried out in order to find a suitable system for the incorporation of the biodegradable, flexible, disulfide-containing monomer B2. The initial polymerization of B2 with aryl iodide A (e.g., attempt at P6, a polymer with the highest possible flexible content) under typical Sonogashira conditions (Pd[Cl$_2$(PPh$_3$)$_2$], CuI, DMF/morpholine) did not yield any polymers with considerable molecular weight, an observation contrary to polymerizations containing a structurally similar flexible monomer lacking the disulfide bond. Due to the lack of use of disulfide-containing reactants in Sonogashira coupling reactions in the literature, together with reported complexation of thiols, and disulfides with the palladium metal,[20] the presence of monomer B2 in the Sonogashira coupling cycle may inhibit the reaction through complexation with the palladium species, where the monomer acts as a bidentate ligand coordinating through the sulfur and nitrogen atoms.

Sonogashira reactions often use ligands to accompany the palladium source for improved catalytic cycle efficiency.[3] Therefore the introduction of a ligand with stronger affinity than B2 towards palladium should lead to efficient polymerization despite the presence of the disulfide-containing monomer.

A screening of reaction conditions using monomers A and B2 under systematically varied combinations of Pd[Cl$_2$(PPh$_3$)$_2$], Pd[(PPh$_3$)$_4$] and Pd(OAc)$_2$ with bidentate ligands 1,4-bis(diphenylphosphino)-butane (dppb), 1,1'-bis(diphenylphosphino)ferrocene (dppf), and 2,2'-bipyridyl (bpy) showed that the presence of dppf in the coupling reaction greatly improves the resulting polymer molecular weights. The optimized reaction conditions (Pd(OAc)$_2$, dppf, CuI, DMF/THF/DIPA) were therefore used to prepare all polymers containing disulfide monomer B2 (FIG. 1).

The resulting series of polymers with variable proportion of flexible, non-conjugated biodegradable linker B2 was prepared by varying the relative stoichiometric ratio of monomers B1 and B2 from 1:0 (no linker B2, fully conjugated PPE, P1) to 0:1 (only linker B2, conjugated trimer units, P6). The physical and photophysical properties are summarized in Table 1, below. The flexible content is denoted as "x" and represents the percentage of B2 out of total amount of diacetylene monomer used. The conjugation length is represented by "n" which denotes the number of arylene units within the conjugated segment. For example, P6 is synthesized exclusively from the reaction between monomers A and B2, resulting in a polymer with three consecutive arylene conjugated units connected via the cystine linker. For P6 "x" is therefore 1, and "n" is equal to 3. The total flexible content in P3 would be 50%—a half of the amount of the B2 proportion "x", owing to the fact that the iodo monomer A and the combined acetylenes are always reacted at a 1:1 ratio.

TABLE 1

Comparison of the Physical and Photophysical Properties of polymers P1-P6 with varying conjugation length.

| Polymer | A equiv. | B1 equiv. | B2 (=x) | $n^a$ | $M_n$ (g/mol)$^b$ | PDI$^c$ | $\lambda_{max,abs}$ (nm)$^d$ | $\lambda_{max,em}$ (nm)$^{d,e}$ | QY (%)$^f$ |
|---|---|---|---|---|---|---|---|---|---|
| P1 | 1 | 1 | 0 | n/a | 18,800 | 1.28 | 441 | 476 | 25 |
| P2 | 1 | 0.90 | 0.10 | 21 | 10,700 | 1.50 | 425 | 473 | 17 |
| P3 | 1 | 0.75 | 0.25 | 9 | 11,800 | 1.47 | 417 | 472 | 20 |
| P4 | 1 | 0.50 | 0.50 | 5 | 12,200 | 1.50 | 399 | 469 | 13 |
| P5 | 1 | 0.75 | 0.25 | 3/5 | 5,300 | 1.54 | 361 | 453 | 6 |
| P6 | 1 | 0 | 1 | 3 | 13,400 | 1.70 | 358 | 406 | 5 |

$^a$Statistically predominant number of phenylene rings within a conjugated segment.
$^b$Determined by gel permeation chromatography in THF.
$^c$PDI (polydispersity index) = $M_w/M_n$.
$^d$Measured in DMF.
$^e$Excitation wavelength 440, 420, 415, 395, 360 and 355 nm in DMF.
$^f$Quantum yield in DMF measured relative to diphenylanthracene standard.

Figure 2:
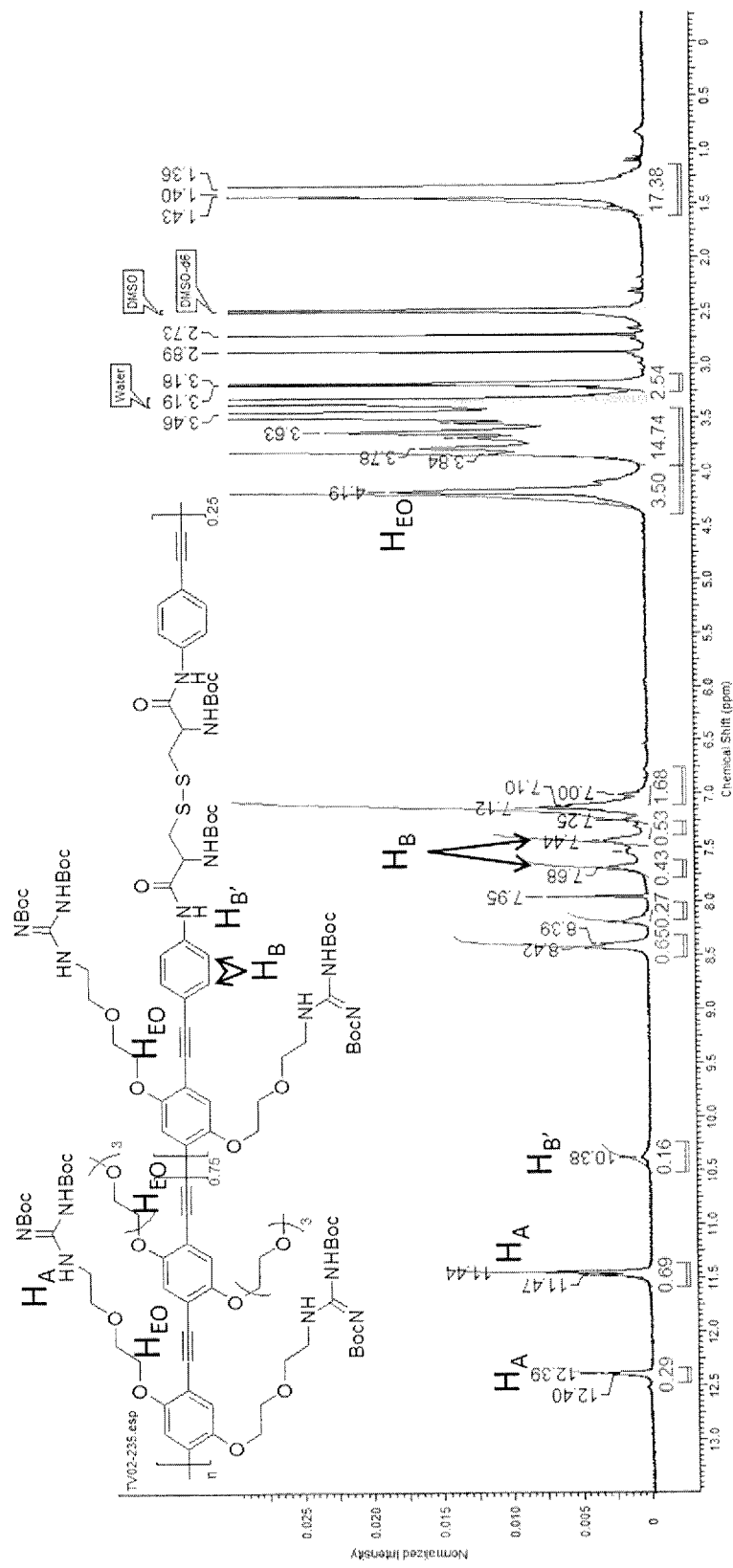
FIG. 2 is a $^1$HNMR spectrum of a terpolymer PPE having a flexible linker according to an embodiment of the invention.

The incorporation of the flexible unit was evaluated by $^1$H NMR spectroscopy, as shown in FIG. 2. The analysis of predicted copolymer structures examined the alkoxy protons on the side-chain of monomers A and B1 ($H_{EO}$, ~4.2 ppm), the guanidinium NH protons characteristic to monomer A ($H_A$, combination of ~11.4 and ~12.4 ppm), the methoxy protons characteristic to monomer B1 (~3.2 ppm), and the aromatic protons ($H_B$, ~7.45 and ~7.65 ppm) and amine NH ($H_{B'}$, ~10.4 ppm) characteristic to monomer B2. All proton peaks were integrated relative to the ethylene oxide proton peak $H_{EO}$, and were in good agreement with the integration values predicted by theoretical copolymer analysis. An example spectrum of polymer P3 is presented in FIG. 2. Based on the B1:B2 feeding ratio (0.75:0.25), the predicted polymer structure calls for $H_{EO}$ proton integration of 3.5 (0.75*4H+0.25*2H). The observed integrations of the remaining peaks correspond well to the predicted values: for $H_A$, predicted 1H (0.75*1H+0.25*1H), observed 0.98 (0.29+ 0.69), for $H_B$ predicted 0.5H (0.25*2H), observed 0.48 (average of 0.43 and 0.53), and for $H_{B'}$ predicted 0.25, observed 0.16 (due to deuterium exchange). The observed integration ratios for all polymers are reported in the Supporting Information together with percent deviations from predicted values. While $^1$H NMR data point towards stoichiometrically controlled B2 incorporation, the technique only provides information about the average sample, and it is therefore not a reliable tool for the prediction of the length of the individual conjugated segments.

A more direct evidence of conjugation length modulation is demonstrated by absorption and emission spectra of the polymers P1-P6, which clearly show a blue shift in absorbance maxima with increasing flexible, non-conjugated linker content (i.e. higher "x", lower "n") (FIG. 3A). This shift indicates that the predominant conjugated units within the polymers indeed structurally correspond to the average units characterized by NMR. A similar trend was expected with the fluorescence maxima of the six polymers (FIG. 3B).

The experimental observations, however, only show this trend with the last three polymers in the series, P4-P6 (FIG.

4). The polymer P6 with the shortest conjugated segments (x=1, n=3) exhibits blue fluorescence at 406 nm as expected, while in polymer P4, in which the B1/B2 feed ratio statistically favors the predominant formation of pentamers (n=5), the emission maximum is significantly red-shifted at 469 nm (>60 nm Stokes shift). Polymer P5, which contains both trimers and pentamers based on the monomer feed ratio (B1:B2 0.25:0.75), shows two emission maxima, one at the wavelength of the trimer (n=3, 408 nm) and one significantly red shifted (453 nm) corresponding to pentamer (n=5). The overlap between the trimer emission and the pentamer absorption maxima (408 nm and 399 nm respectively) leads to resonance energy transfer (RET) from the shorter, higher-energy trimer units to the longer, lower energy pentamers, resulting in the pentamer units being the major emitting species. This explanation is consistent with the observed P5 emission spectrum which features the predominant red-shifted emission at 453 nm. Past studies of a structurally related conjugated poly-p-(phenylynevinylene)s (PPVs) observed a similar trend.[13] Furthermore, the emission peaks of the shorter polymers undergoing RET are very broad, while polymers with increased conjugation length and consequent decrease of the amount of RET (P1 and P2), vibrational structure can be observed. No further significant red-shifting of emission maxima occurs with additional increase in conjugation length past pentamer (P4→P1), suggesting that the effective conjugation length for this series of PPEs is reached with approximately 5 aromatic segments. Theoretical calculations on a series of oligo p-phenylene-ethynylenes[21] agree that while in perfectly planar systems the effective conjugation length is saturated at around 10 aromatic units, this number decreases to around 5 when the planarity of the conjugated segment is disturbed. Thus by keeping the amount of the flexible linker to below 25% of the total polymer content (P4 and longer), it is possible to fabricate flexible polymers with good solubility and photophysical properties exhibiting those of a fully-conjugated PPE polymer backbone.

Advantageously, this step-growth polymerization, which is expected to be completely random, leads to a series of polymers with relatively well-defined, predictable pattern of monomer incorporation as evidenced by the UV absorbance trend. One explanation is that a preferential formation of the PPE-conjugated oligomeric segments happens between monomers A and B1, which are subsequently linked up into a polymer in a reaction with B2. To test this hypothesis, Synthesis of polymer P3 was carried out by the sequential addition of monomers. A (1 eq) and B1 (0.75 eq) were allowed to react for 2 hours in the absence of linker B2. The resulting oligomers P3a exhibited photophysical properties similar to the one-pot polymer P3. When the remaining monomer B2 (0.25 eq) was added and the polymerization allowed to proceed overnight, polymer P3b exhibited an increase in polymer molecular weight relative to oligomers P3a and conserved photophysical properties analogous to those of P3. The number average molecular weight of the polymer P3b more than doubled compared to oligomers P3a, and ¹H NMR clearly demonstrates the incorporation of linker B2 into the polymer (see SI).

TABLE 2

Sequential addition experiment.

| Polymer | A | B1 | B2 | $M_n$ (g/mol) | PDI | $\lambda_{max,abs}$ (nm) | $\lambda_{max,em}$ (nm) | QY (%) |
|---|---|---|---|---|---|---|---|---|
| P1 | 1 | 1 | 0 | 18,800 | 1.28 | 441 | 476 | 25 |
| P3 | 1 | 0.75 | 0.25 | 11,800 | 1.47 | 417 | 472 | 20 |
| P3a | 1 | 0.75 | — | 2,000 | 2.15 | 425 | 476 | 12 |
| P3b | 1 | 0.75 | 0.25 | 5,100 | 1.90 | 420 | 472 | 10 |

This hypothesis assumes that B1 will undergo coupling in the Sonogashira cycle more readily than B2. The acetylene proton $pK_a$ values are comparable between B1 and B2, so the formation of the copper acetylide is not considered a contributing factor in the monomer reactivity. In the Sonogashira catalytic cycle the transmetalation step is typically the rate-determining step,[15] during which the copper acetylide is transferred to the palladium-arene-iodide complex. Preferential incorporation of B1 into the polymer appears to be due to the compact structure of the monomer which allows for a more straightforward transmetalation event compared to the large, flexible, long and freely rotating monomer B2. However, the copper cycle which facilitates the addition of the alkyne species to the palladium catalytic cycle is not well understood, and other factors such as monomer solubility can play a role in determining its reactivity in this complex system.

In one embodiment, the subject invention provides a three-monomer system with a variable feed ratio of a flexible, biodegradable, non-conjugated unit under Sonogashira coupling conditions that leads to the stoichiometric incorporation of the monomers into the polymer backbone, allowing for the tuning of the length of the conjugated segments within the polymer. In accordance with the subject invention, polymers with 25% or less flexible content exhibit photophysical properties analogous to that of a fully-conjugated PPE backbone. The subject invention facilitates the controlled incorporation of additional features such as flexibility and biodegradability into the conventional PPE polymers without the loss of their excellent photophysical properties.

Figure 5:
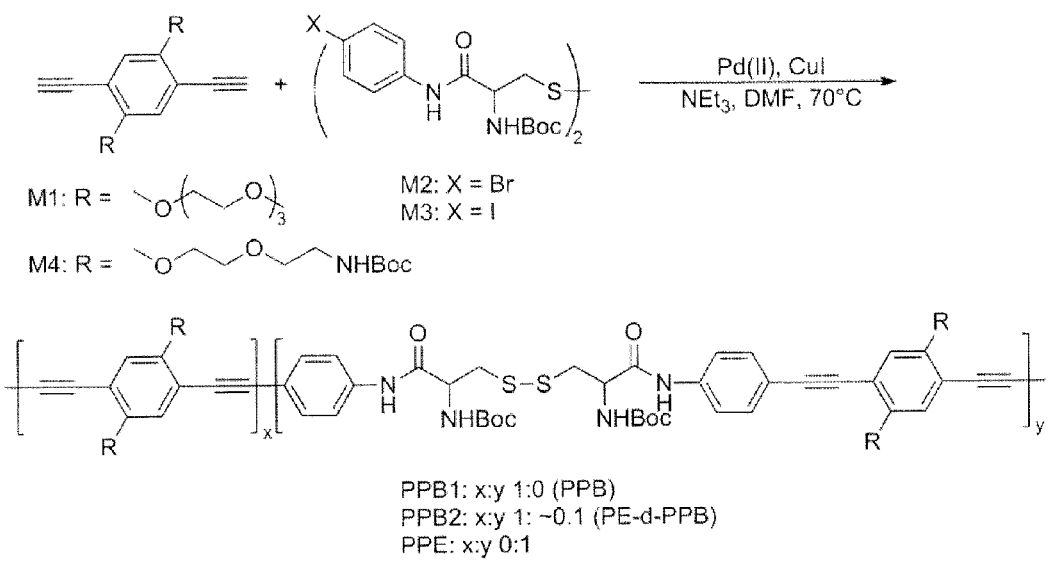
FIG. 5 shows a reaction scheme for an alternate preparation of co- or terpolymer PPEs, according to an embodiment of the invention.
Figure 6:
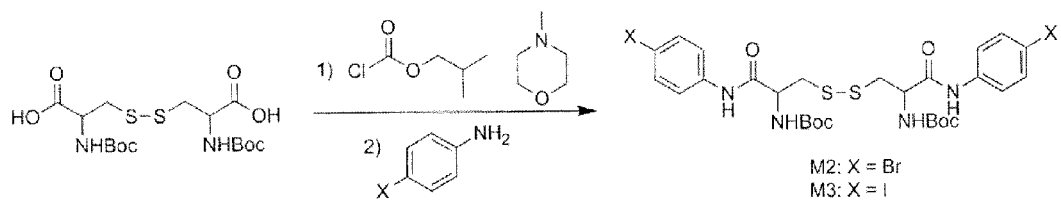
FIG. 6 shows a reaction scheme for the synthesis of a di(haloaryl) flexible spacer, according to an embodiment of the invention.
Figure 7:
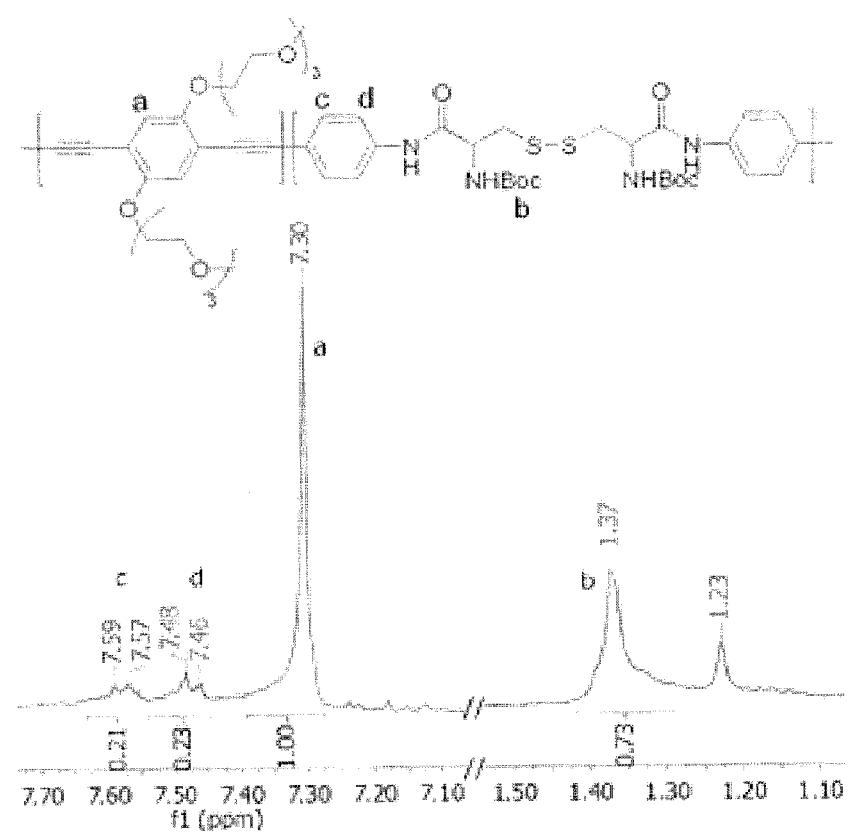
FIG. 7 is a $^1$HNMR spectrum of a terpolymer PPE having a flexible linker according to an embodiment of the invention.
Figure 8A:
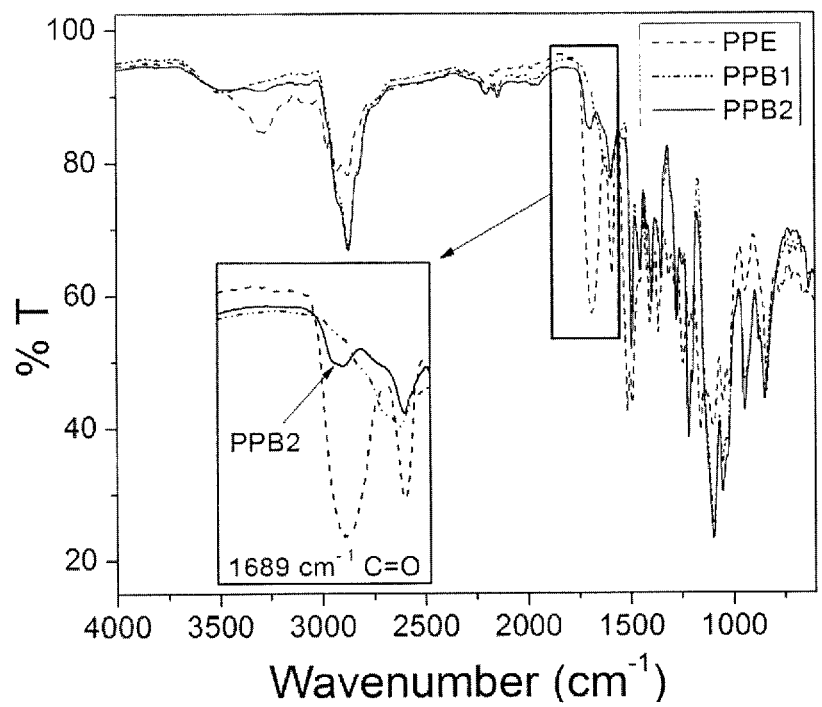
FIG. 8A is a composite of normalized FTIR spectra.
Figure 8B:
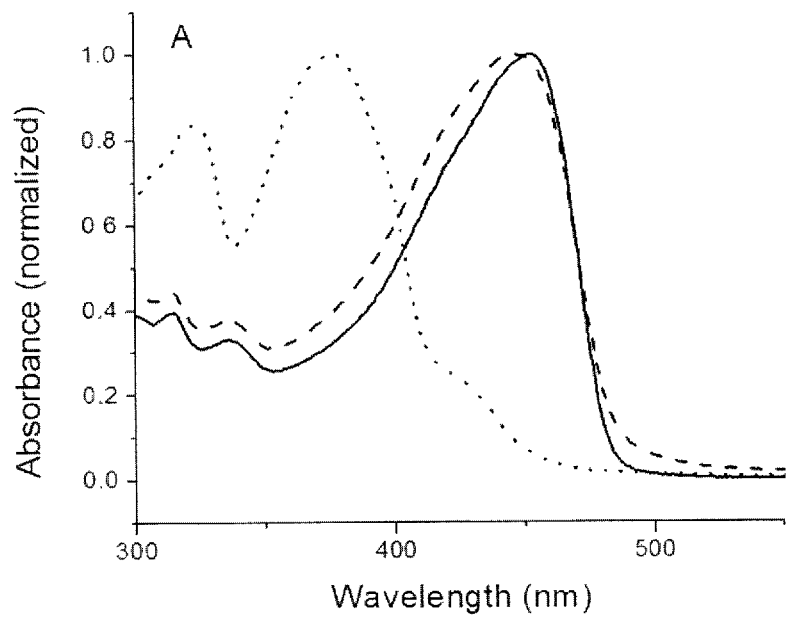
FIG. 8B is a composite of normalized absorption spectra.
Figure 8C:
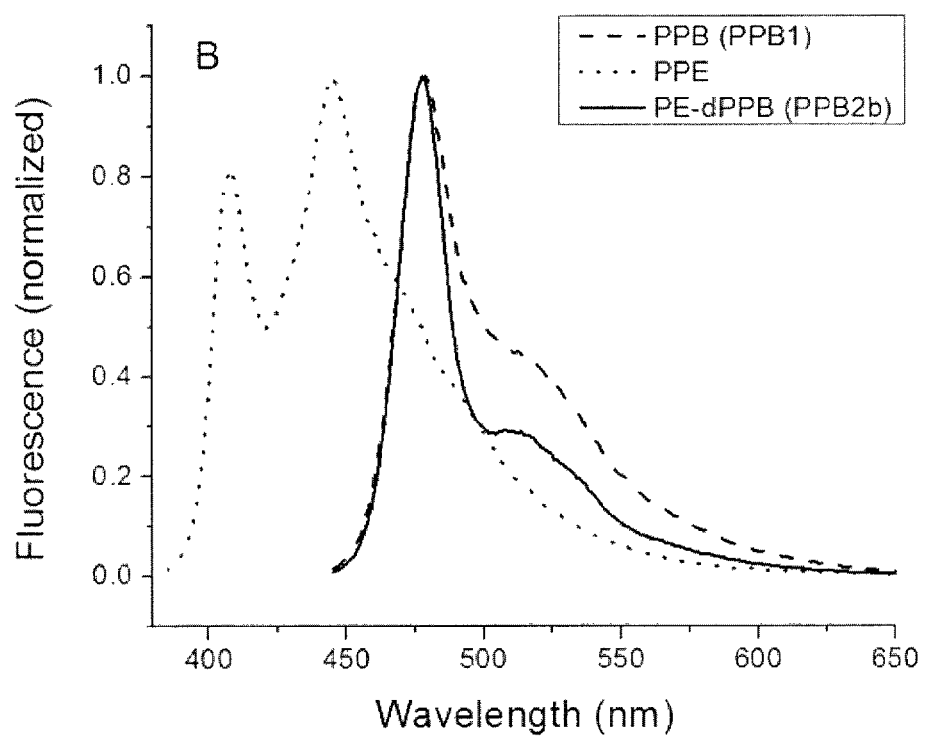
FIG. 8C is a composite of normalized emission spectra of polymers PPB, PPE, and PE-dPPB for various co- and terpolymer PPEs according to an embodiment of the invention.

In embodiments of the subject invention, the flexible linker can be provided by a diacetylide monomer or the dihaloaryl monomer. The use of a flexible linker between two aryl halides is shown in FIG. 5 that is prepared as shown in FIG. 6. In this embodiment of the invention, the conjugation length depends upon the coupling conditions, where a Glaser coupling promotes long conjugation sections from the coupling of diacetylene monomers and short (trimer) conjugation lengths from Sonogashira coupling. A proton NMR spectrum of a polymer made according to the scheme of FIG. 5 is shown in FIG. 7. Composite FTIR, absorbance, and emission spectra, for the different PPEs formed by Glaser coupling, Sonogashira coupling, and competitive coupling is shown in FIG. 8A, FIG. 8B and FIG. 8C.

Figure 9:
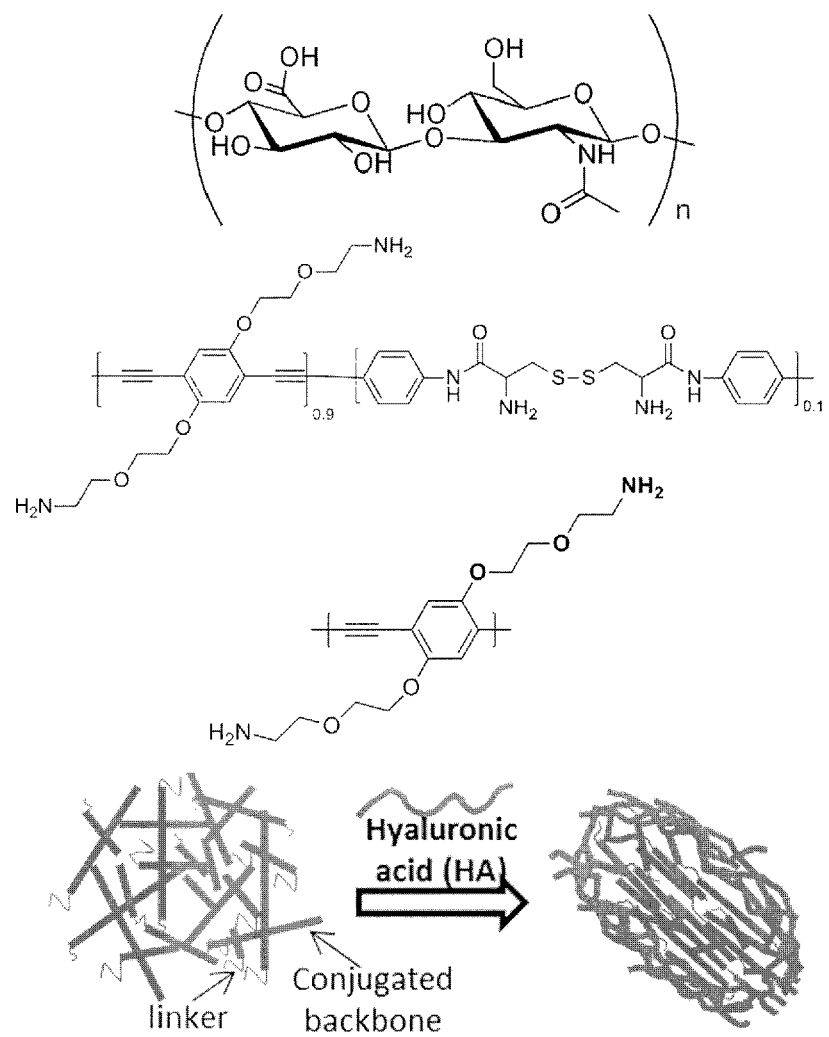
FIG. 9 shows structures for the components and a scheme for the formation of a complex between hyaluronic acid and an amine substituted PPE, according to an embodiment of the invention.
Figure 10:
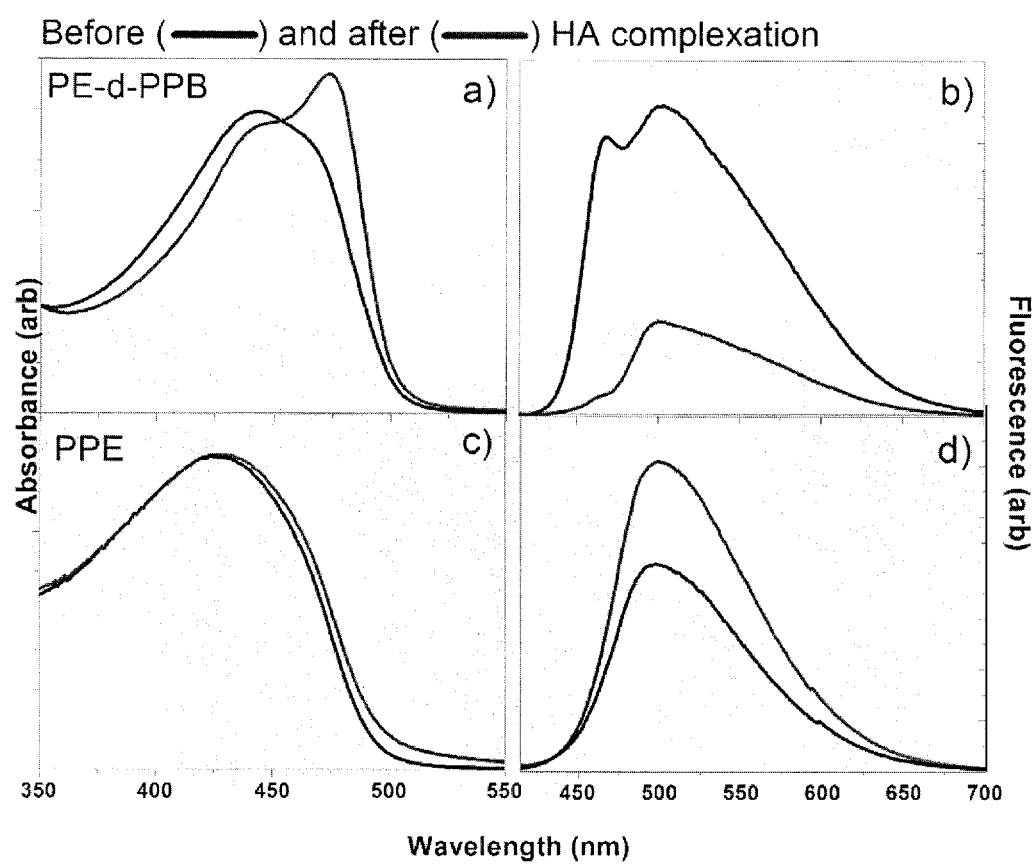
FIG. 10 shows composite absorption and emission spectra for uncomplexed PPEs and their complex with hyaluronic acid, according to an embodiment of the invention.
Figure 11:
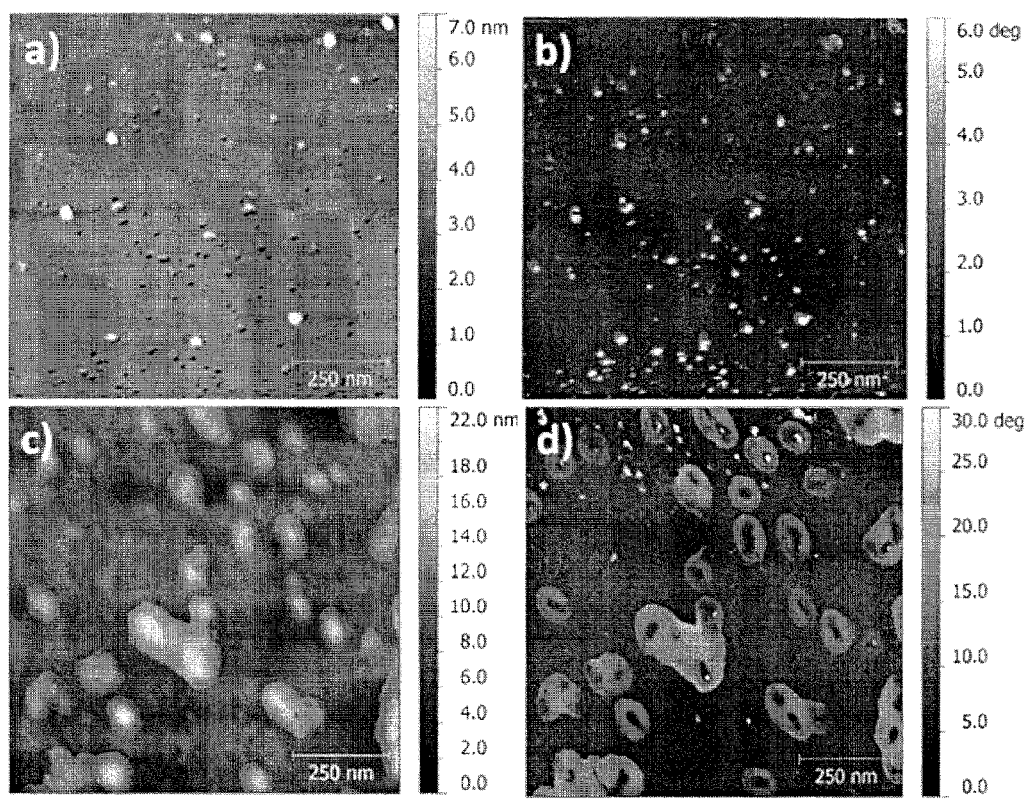
FIG. 11 shows micrographs of PPE-hyaluronic acid complexed nanoparticles, according to an embodiment of the invention.

The PPEs with flexible linkers can form complexes between the amines and carboxylic acid groups of polymers, including biopolymers, for example, a complex with hyaluronic acid, as illustrated in FIG. 9. The complexation can be observed by absorption and emission spectroscopy, as shown in FIG. 10. The complexation from solution results in the formation of nanoparticles, as shown in FIG. 11.

Figure 12A:
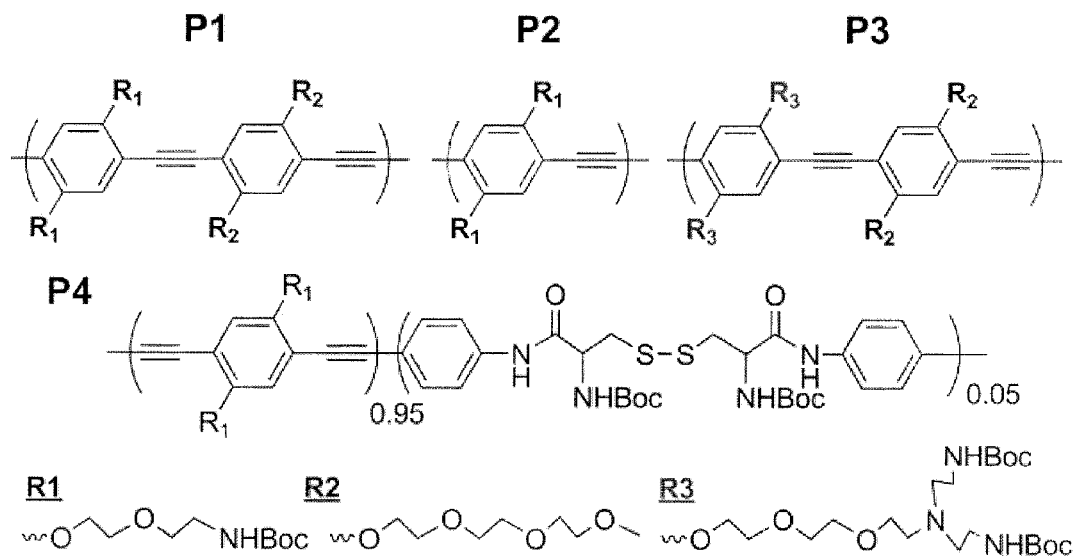
FIG. 12A shows structures of PPEs and FIG. 12B shows plots of Golgi localization affinities for the structures of FIG. 12A.
Figure 12B:
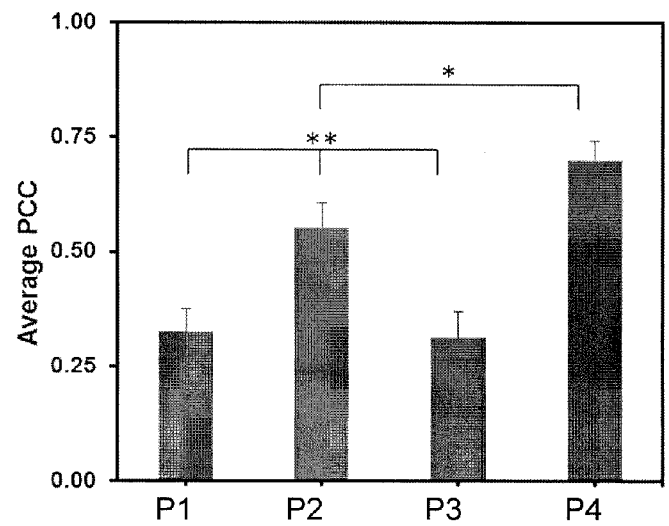
Figure 13:
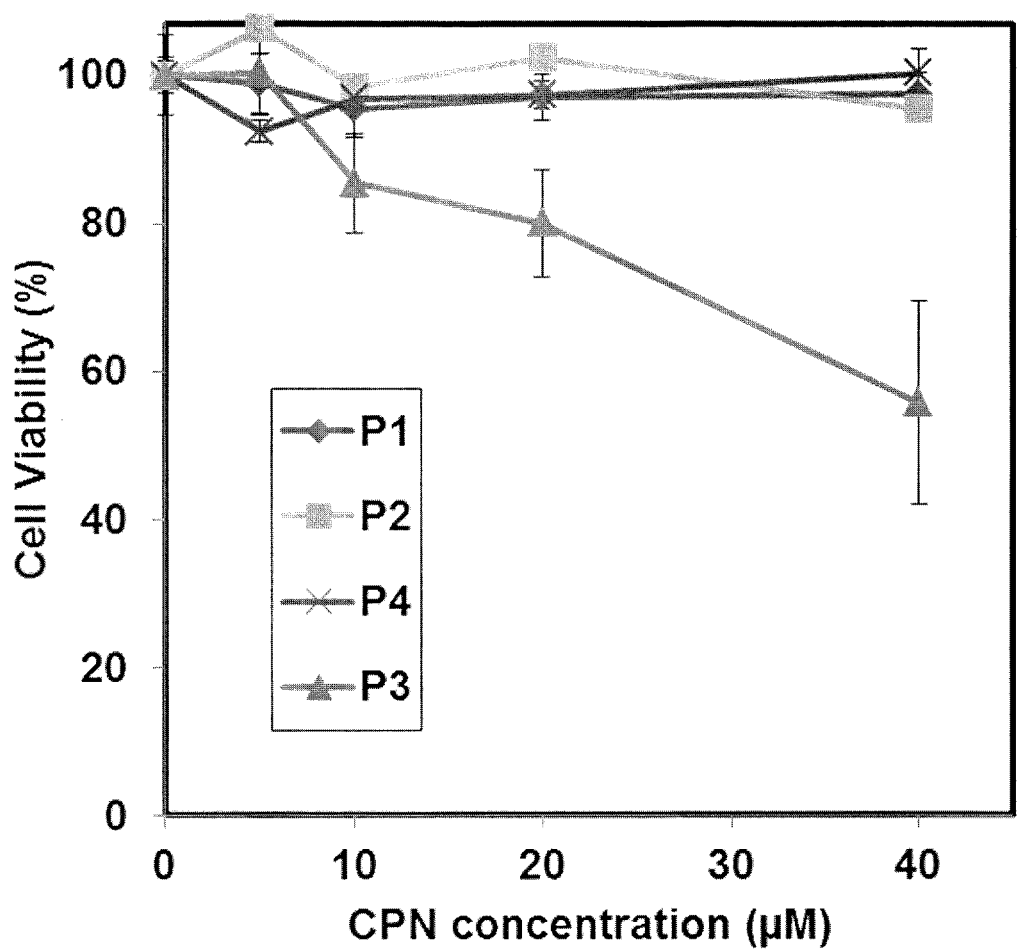
FIG. 13 shows a plot of cell viability for their exposure to the PPEs of FIG. 12A, according to an embodiment of the invention.

The PPEs with flexible linkers can be modified by the side groups attached to the aromatic units of the polymers. For example as can be seen in FIG. 12A, the structure can be varied, and depending of the polymers microstructure, the structural variation leads to selectivity of the polymers for specific cells, as indicated the Golgo localization selectivity illustrated in FIG. 12B. The structures and photophysical properties for the polymers of FIG. 12A are tabulated in Table 3, below. The functional groups effected toxicity to cells depending on the side groups, as shown in FIG. 13.

TABLE 3

Structures and properties of polymers prepared from competitive Glaser and Sonogashira coupling.

| CPN | Type | $M_n$ (kDa)[a] | PDI[b] | Abs $\lambda_{max}$[c] (nm) | Emission $\lambda_{max}$[d] (nm) | Quantum Yield[e] | Hydrodynamic radius (d · nm)[f] | Zeta Potential (mV)[f] |
|---|---|---|---|---|---|---|---|---|
| P1 | PPE | 11.8 | 1.43 | 427 | 492 | 2% | 71.22 | +42.3 |
| P2 | PPE | 16.4 | 1.49 | 433 | 496 | 3% | 60.55 | +20.2 |
| P3 | PPE | 10.7 | 1.64 | 420 | 496 | 2% | 58.34 | +44.3 |
| P4 | PE-d-PPB | 22.3 | 2.28 | 444 | 500 | 1% | 87.41 | +46.2 |

REFERENCES

1. Tour, J. M., *Chem. Rev.* 1996, 96, 537-554.
2. (a) Thomas, S. W. I.; Joly, G. D.; Swager, T. M., *Chem Inform* 2007, 38, no-no; (b) Günes, S.; Neugebauer, H.; Sariciftci, N. S., *Chem. Rev.* 2007, 107, 1324-1338.
3. Chinchilla, R.; Najera, C., *Chem. Rev.* 2007, 107, 874-922.
4. Huang, S.; Tour, J. M., *Tetrahedron Lett.* 1999, 40, 3447-3450.
5. Kovalev, A. I.; Takeuchi, K.; Barzykin, A. V.; Asai, M.; Ueda, M.; Rusanov, A. L., *Macromol. Chem. Phys.* 2005, 206, 2112-2121.
6. Kang, S.; Ono, R. J.; Bielawski, C. W., *J. Am. Chem. Soc.* 2013, 135, 4984-4987.
7. B. VanVeller, T. M. Swager, "Poly(aryleneethynylene)s" pages 175-200 in Design and Synthesis of Conjugated Polymers, M. Leclerc, J. Morin (Eds.) Wiley-VCH: Weinheim, 2010.
8. Chong, H.; Duan, X.; Yang, Q.; Liu, L.; Wang, S., *Macromolecules* 2010, 43, 10196-10200.
9. Vokatá T.; Moon, J. H., *Macromolecules* 2013, 46, 1253-1259.
10. Twomey, M.; Na, Y.; Roche, Z.; Mendez, E.; Panday, N.; He, J.; Moon, J. H., *Macromolecules* 2013, 46, 6374-6378.
11. Mendez, E.; Moon, J. H., *Chem. Commun.* 2013, 49, 6048-6050.
12. Swager, T. M.; Gil, C. J.; Wrighton, M. S., *The Journal of Physical Chemistry* 1995, 99, 4886-4893.
13. Hay, M.; Klavetter, F. L., *J. Am. Chem. Soc.* 1995, 117, 7112-7118.
14. (a) Takagi, K.; Tahara, A.; Kakiuchi, H., *Polym. J* 2009, 41, 733-738; (b) Sun, M.; Wang, L.; Yang, W., *J. Appl. Polym. Sci.* 2010, 118, 1462-1468.
15. He, C.; Ke, J.; Xu, H.; Lei, A., *Angew. Chem. Int. Ed.* 2013, 52, 1527-1530.
16. https://ace.chem.illinois.edu/ace/public/pKa.jsp
17. Schug, K. A.; Lindner, W., *Chem. Rev.* 2004, 105, 67-114.
18. (a) Zhu, X.; Yang, J.; Schanze, K. S., *Photochemical & Photobiological Sciences* 2014, 13, 293-300; (b) Vargas, J. R.; Stanzl, E. G.; Teng, N. N. H.; Wender, P. A., *Molecular Pharmaceutics* 2014; (c) Tabujew, I.; Freidel, C.; Krieg, B.; Helm, M.; Koynov, K.; Müllen, K.; Peneva, K., *Macromol. Rapid Commun.* 2014, n/a-n/a.
19. Saito, G.; Swanson, J. A.; Lee, K.-D., *Advanced Drug Delivery Reviews* 2003, 55, 199-215.
20. (a) Åkerfeldt, S.; Lövgren, G., *Anal. Biochem.* 1964, 8, 223-228; (b) Spera, M. B. M.; Quintão, F. A.; Ferraresi, D. K. D.; Lustri, W. R.; Magalhães, A.; Formiga, A. L. B.; Corbi, P. P., *Spectrochimica Acta Part A: Molecular and Biomolecular Spectroscopy* 2011, 78, 313-318.
21. Li, N.; Jia, K.; Wang, S.; Xia, A., *The Journal of Physical Chemistry A* 2007, 111, 9393-9398.

What is claimed is:

1. A conjugated polymer, comprising a poly(p-phenyleneethynylene) (PPE) having a flexible linker between a portion of phenylene units, comprising the structure:

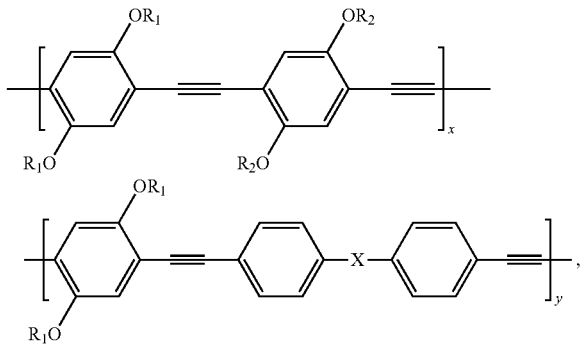

wherein $R_1$ and $R_2$ independently are substituents that provide solubility and/or a functionality for bonding or associating with a molecule, wherein X is a flexible unit of at least two atoms that do no conjugate with the adjacent phenylenes, and wherein x+y is 2 to 100,000 and x is 0.01y to 100y.

2. The conjugated polymer according to claim 1, wherein the $R_1$ and $R_2$ are independently a polyethyleneoxide oligomer or an alkyl group, optionally terminated with a functionality comprising at least one amine, carboxylic acid, thiol, hydroxy, or any combination thereof.

3. The conjugated polymer according to claim 1, wherein the (PPE) has the structure:

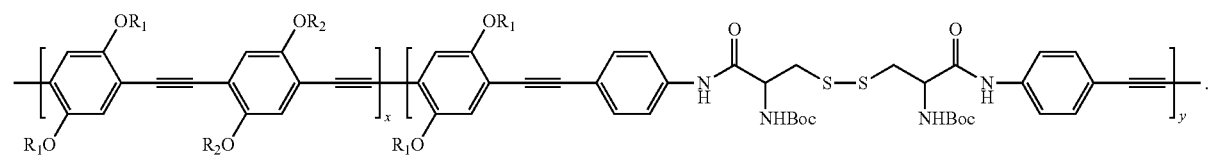

4. The conjugated polymer according to claim 3, wherein R₁ is:

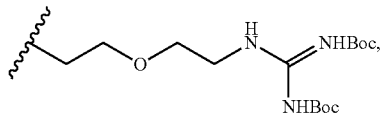

and R₂ is:

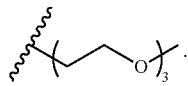

5. The conjugated polymer according to claim 1, wherein x is 0.1y to 10y.

6. The conjugated polymer according to claim 1, further comprising at least a fourth repeating unit.

7. A complex comprising, a conjugated polymer according to claim 1 and a molecule having a complementary functionality for complexation to a functionality of at least one of R₁ and R₂.

8. The complex according to claim 7, wherein the molecule is a biopolymer.

9. The complex according to claim 7, wherein the molecule is hyaluronic acid.

10. The complex according to claim 7, wherein the complex is in the form of a nanoparticle.

11. A method of preparing a conjugated polymer according to claim 1 comprising:

providing at least one diacetylene substituted phenylene monomer and/or at least one dihalo substituted phenylene monomer;

providing at least one monomer comprising a flexible linker at least two phenylenes substituted with acetylene functionality or halo phenylene functionality;

providing a Sonogashira catalyst; and combining the at least one diacetylene substituted phenylene monomer and/or at least one dihalo substituted phenylene monomer with the at least one monomer comprising a flexible linker with the Sonogashira catalyst, wherein condensation occurs to form the conjugated polymer according to claim 1.

* * * * *